United States Patent
Belcea et al.

(10) Patent No.: US 7,295,159 B1
(45) Date of Patent: Nov. 13, 2007

(54) METHOD FOR MEASURING TIME OF ARRIVAL OF SIGNALS IN A COMMUNICATIONS NETWORK

(75) Inventors: John M. Belcea, West Melbourne, FL (US); Pertti O. Alapuranen, Deltona, FL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 11/553,328

(22) Filed: Oct. 26, 2006

(51) Int. Cl.
*G01S 1/24* (2006.01)
*G01S 3/02* (2006.01)

(52) U.S. Cl. .................. 342/465; 342/387; 342/463
(58) Field of Classification Search ............... 342/387, 342/463–465
See application file for complete search history.

(56) References Cited

U.S. PATENT DOCUMENTS

| | | | |
|---|---|---|---|
| 2003/0117319 A1* | 6/2003 | Rideout et al. | 342/387 |
| 2003/0227895 A1 | 12/2003 | Strutt et al. | |
| 2005/0169233 A1 | 8/2005 | Kandala et al. | |
| 2005/0186966 A1 | 8/2005 | Belcea | |
| 2006/0029009 A1 | 2/2006 | Alapuranen et al. | |
| 2006/0029010 A1 | 2/2006 | Belcea | |

OTHER PUBLICATIONS

N. Kouguchi et al., A study of the distortion and propagation time-delay of Loran-C pulse wave based on a model of the propagation path, Electronics and Communications in Japan (Part I: Communications), vol. 75(7), p. 80-92, 1992.*

* cited by examiner

*Primary Examiner*—Thomas H. Tarcza
*Assistant Examiner*—Fred H. Mull
(74) *Attorney, Agent, or Firm*—Randi L. Karpinia (57) ABSTRACT

A method for measuring the Time Of Arrival of signals in a communications network is provided. A transmitter emits a beacon that is a digital message of known content, followed by timing information. The message is preceded by a pseudo-random binary phase-shift keying (BPSK) modulated sequence that allows the receiver to synchronize on the received signal using the autocorrelation method. During the synchronization process, are computed the approximated Time Of Arrival (TOA) and approximated frequency difference between the local oscillator and the received signal. The content of the beacon message is then used for correcting the approximated TOA and the frequency differences, providing results of very high precision of TOA. The timing information that follows the beacon is used for network clock synchronization and for computing the distances between network nodes.

14 Claims, 6 Drawing Sheets

METHOD FOR MEASURING TIME OF ARRIVAL OF SIGNALS IN A COMMUNICATIONS NETWORK

FIELD OF THE INVENTION

The present invention relates generally to wireless communications and more particularly to computing the time of arrival (TOA) of radio signals in wireless ad-hoc networks using quadrature amplitude modulation (QAM) radios.

BACKGROUND

The Time Of Arrival (TOA) of radio signals is used by many applications running on wireless networks for synchronizing the network clocks, for measuring the distance between two devices, and/or for computing device positions. The accuracy of clock synchronization and of position services (i.e. Geographic, Geocentric or Relative positioning) depends on the accuracy of the measurement of the Time Of Arrival. From TOA can be determined the Time Of Flight (TOF), the Time Difference Of Arrival (TDOA), the clock shift and other time related entities that can be used in specific algorithms for computing the position of an object in relation with others or for synchronizing clocks in a wireless network.

One method for synchronizing clocks of wireless network nodes or for measuring distances between wireless devices includes the transmission of a radio impulse. The receiver identifies the moment when the impulse is received and records the clock value. The precision of the method depends on the length of the impulse and the clock resolution. For providing accurate precision, the impulse has to be very short. This has two undesired consequences: (a) because of its short length (preferably less than one nanosecond) the signal has very little energy and cannot propagate very far; and (b) the signal has many harmonics of almost equal energy spread over a large spectrum. Due to these undesired consequences, the impulse method has little practical application.

Traditionally, in wireless digital networks, the TOA is measured using the impulse response method that results from autocorrelation. According with this method, a pseudo-random sequence of binary modulated signals is transmitted. The received signal is correlated with the same pseudo-random sequence. In time, the autocorrelation function provides an almost flat response except for at the moment when the received sequence matches the reference sequence of pseudo-random binary symbols. The shape of the response of the autocorrelation function is similar to an impulse, although the signal from which it is generated has a relative narrow band and does not require large amount of energy.

Figure 1:
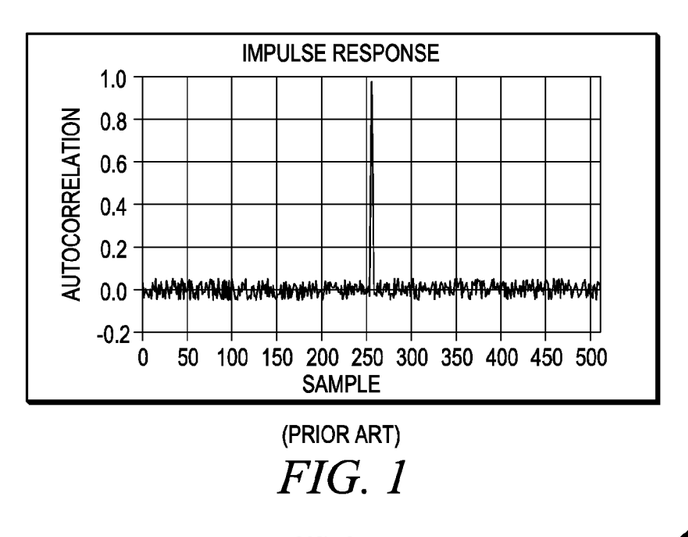
FIG. 1 illustrates a typical impulse response for a pseudo-random sequence using binary phase-shift keying (BPSK) modulation.

FIG. 1 illustrates a typical impulse response for a pseudo-random sequence using binary phase-shift keying (BPSK) modulation. The receiver uses the peak of the impulse response for synchronizing to the received signal. The precision of the autocorrelation method is in inverse relation with the duration of transmission of one binary symbol, therefore with the width of the radio channel. For example, using a twenty (20) Megahertz (MHz) channel, a fifty (50) nanosecond precision of TOA is achieved with this method, while using a one hundred (100) MHz width channel, the achieved precision is ten (10) nanosecond.

BRIEF DESCRIPTION OF THE FIGURES

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of method steps and apparatus components related to measuring time of arrival of signals in a communications network. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

It will be appreciated that embodiments of the invention described herein may be comprised of one or more conventional processors and unique stored program instructions that control the one or more processors to implement, in conjunction with certain non-processor circuits, some, most, or all of the functions of measuring time of arrival of signals in a communications network described herein. The non-processor circuits may include, but are not limited to, a radio receiver, a radio transmitter, signal drivers, clock circuits, power source circuits, and user input devices. As such, these functions may be interpreted as steps of a method to measure time of arrival of signals in a communications network. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The present invention provides a method and apparatus for measuring time of arrival of signals in ad hoc networks using QAM radios. The method is applicable to wireless networks using digital communication with capability to modulate the radio signal in phase and amplitude. The transmitter emits a beacon that is a digital message of known content. The message is preceded by the pseudo-random BPSK modulated sequence that allows the receiver to synchronize on the received signal using the autocorrelation method. During the synchronization process, the approximated TOA and approximated frequency difference between the local oscillator and the received signal are computed. The content of the beacon message is then used for correcting the approximated TOA and the frequency differences, providing results of very high precision.

Figure 2:
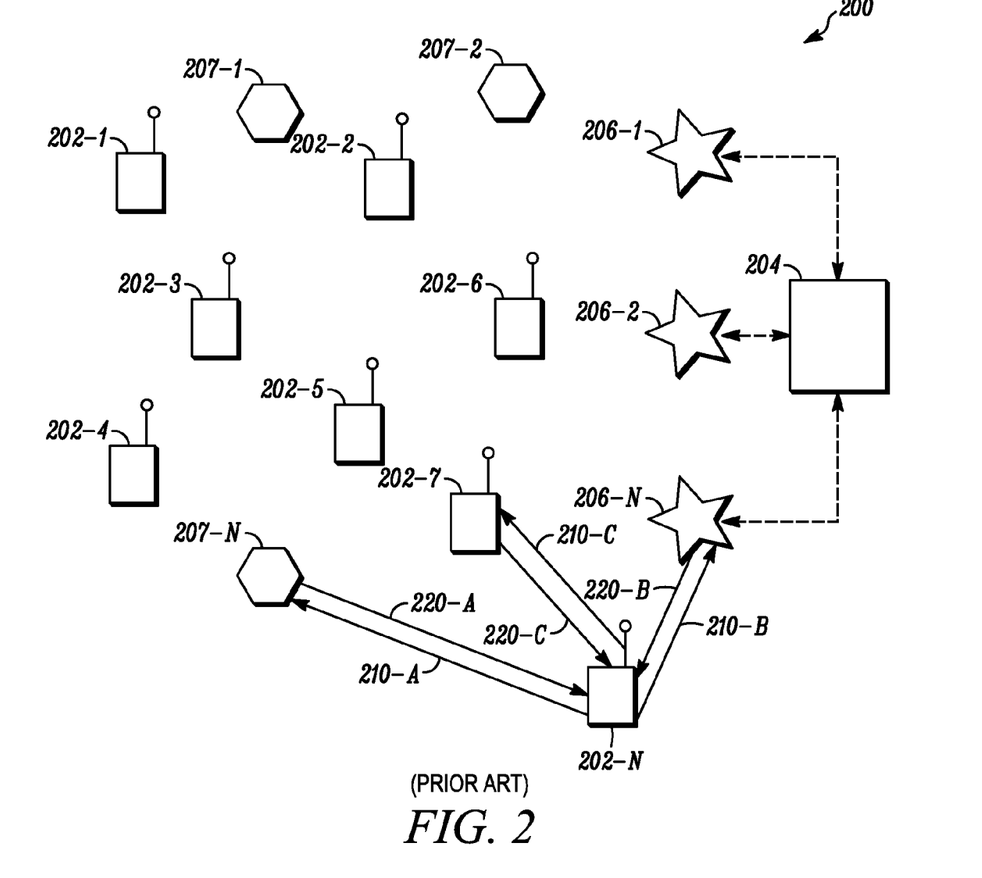
FIG. 2 is a block diagram of an example communication network employing a system and method in accordance with an embodiment of the present invention.

FIG. 2 is a block diagram illustrating an example of a communication network 200 employing an embodiment of the present invention. For illustration purposes, the communication network 200 comprises an adhoc wireless communications network. For example, the adhoc wireless communications network can be a mesh enabled architecture (MEA) network or an 802.11 network (i.e. 802.11a, 802.11b, or 802.11g). It will be appreciated by those of ordinary skill in the art that the communication network 200 in accordance with the present invention can alternatively comprise any packetized communication network. For example, the communication network 200 can be a network utilizing packet data protocols such as TDMA (time division multiple access), GPRS (General Packet Radio Service) and EGPRS (Enhanced GPRS). The communication network 200 further employs quadrature amplitude modulation (QAM) techniques for communication among the various devices within the communication network 200.

As illustrated in FIG. 2, the communication network 200 includes a plurality of mobile nodes 202-1 through 202-n (referred to generally as nodes 202 or mobile nodes 202 or mobile communication devices 202), and can, but is not required to, include a fixed network 204 having a plurality of access points 206-1, 206-2, . . . 206-n (referred to generally as nodes 206 or access points 206), for providing nodes 102 with access to the fixed network 104. The fixed network 104 can include, for example, a core local access network (LAN), and a plurality of servers and gateway routers to provide network nodes with access to other networks, such as other ad-hoc networks, a public switched telephone network (PSTN) and the Internet. The communication network 200 further can include a plurality of fixed routers 207-1 through 207-n (referred to generally as nodes 207 or fixed routers 107 or fixed communication devices 107) for routing data packets between other nodes 202, 206 or 207. It is noted that for purposes of this discussion, the nodes discussed above can be collectively referred to as "nodes 202, 206 and 207", or simply "nodes" or alternatively as "communication devices."

As can be appreciated by one skilled in the art, the nodes 202, 206 and 207 are capable of communicating with each other directly, or via one or more other nodes 202, 206 or 207 operating as a router or routers for packets being sent between nodes. As illustrated in FIG. 2, each node communicates with other neighboring nodes using a transmitting link and a receiving link associated with the node and each of the neighboring nodes. For example, node 202-N, as illustrated, communicates with node 207-N using a transmitting link 210-A and a receiving link 220-A, communicates with node 206-N using a transmitting link 210-B and a receiving link 220-B, and communicates with node 202-7 using a transmitting link 210-C and a receiving link 220-C. Associated with each communication link (i.e. each transmitting link 210 and each receiving link 220) are Time of Arrival data for various signals being communicated.

The communication network 200 of FIG. 2, in accordance with the present invention, is a beacon enabled network. One or more of the nodes 202, 206, 207 of the communication network 200, for example, transmit periodic beacons to confirm their presence to other network nodes. In general, nodes may sleep between beacons, thus lowering their duty cycle and extending their battery life. In beaconing networks, nodes only need to be active while a beacon is being transmitted. It will be appreciated by those of ordinary skill in the art that when nodes are involved in clock synchronization or providing support to location services, the sleeping schedule is adjusted accordingly.

Figure 3:
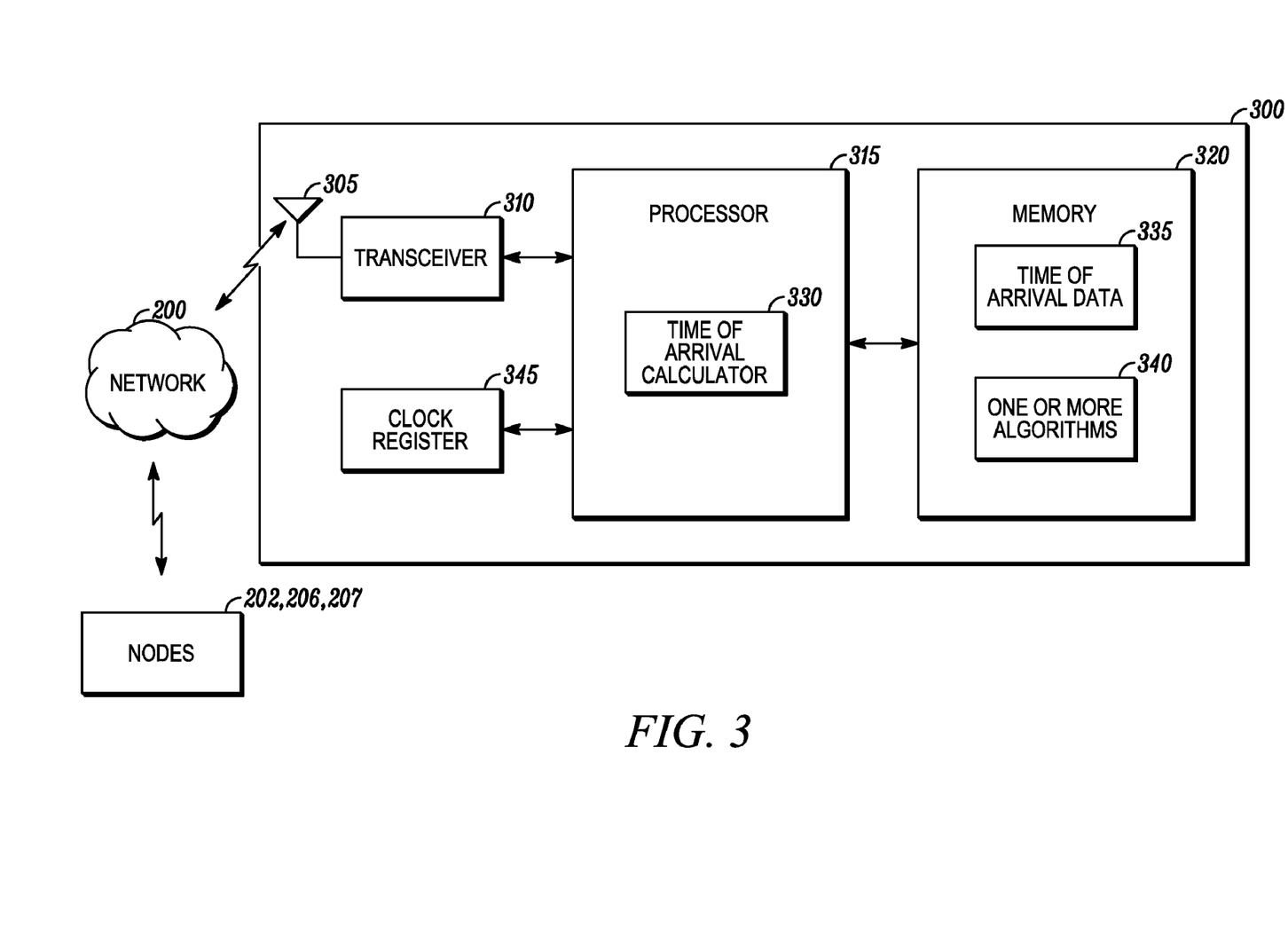
FIG. 3 is a block diagram illustrating an example of a communication device employed in the communication network shown in FIG. 2 in accordance with an embodiment of the present invention.

FIG. 3 is an electronic block diagram of one embodiment of a communication device 300 in accordance with the present invention. The communication device 300, for example, can exemplify one or more of the nodes 202, 206, and 207 of FIG. 2. The communication device 300, in operation, is capable of quadrature amplitude modulation (QAM) communication. QAM is the amplitude modulation and demodulation of two carriers that have the same frequency but are in phase quadrature to each other. It can be either analog or digital. As illustrated, the communication device 300 includes an antenna 305, a transceiver (or modem) 310, a processor 315, a memory 320, and a clock register 345.

The antenna 305 intercepts transmitted signals from one or more nodes 202, 206, 207 within the communication network 200 and transmits signals to the one or more nodes 202, 206, 207 within the communication network 200. The antenna 305 is coupled to the transceiver 310, which employs conventional demodulation techniques for receiving and transmitting communication signals, such as packetized signals, to and from the communication device 300 under the control of the processor 315. The packetized data signals can include, for example, voice, data or multimedia information, and packetized control signals, including node update information. When the transceiver 310 receives a command from the processor 315, the transceiver 310 sends a signal via the antenna 305 to one or more devices within the communication network 200. In an alternative embodiment (not shown), the communication device 300 includes a receive antenna and a receiver for receiving signals from the communication network 200 and a transmit antenna and a transmitter for transmitting signals to the communication network 200. It will be appreciated by one of ordinary skill in the art that other similar electronic block diagrams of the same or alternate type can be utilized for the communication device 300.

Coupled to the transceiver 310, is the processor 315 utilizing conventional signal-processing techniques for processing received messages. It will be appreciated by one of ordinary skill in the art that additional processors can be utilized as required to handle the processing requirements of the processor 315.

The processor 315, for example, includes various processing blocks to process QAM messages. For example, the processor 315 can include an I-channel interleaving block, a Q-channel interleaving block, and a multiplexer (all not shown) for processing a QAM message for transmission. The processor 315 further can include a de-multiplexer, an I-channel de-interleaving block and a Q-channel de-interleaving block (all not shown) for processing a received QAM message.

The clock register 345, coupled to the processor 315, referred to as a "clock", comprises a hardware device continuously counting pulses. The content of the clock device can be read when the clock value is needed. The clock register 345 is incremented periodically. The register can be included in the processor 315 and/or in hardware coupled to the processor 315 as illustrated. Because the clocks are not synchronized, all clock registers of devices involved in a network show different values at any given time. When the clock register is full, its content returns to zero. Therefore, each node's clock register shows a time equal to zero at a periodic rate.

The term "clock tick" refers to the time passed between two pulses counted by the clock register 345. The term "clock time" refers to the value recorded in the clock register 345 at a particular moment. In this context, "Time Of Arrival" is the number recorded in the clock register 345 at the moment when a radio signal is received.

In accordance with the present invention, the processor 315 includes a time of arrival calculator 330 for determining a time of arrival of a direct radio signal communicated with the communication device 300 within the communication network 200. It will be appreciated by those of ordinary skill in the art that the time of arrival calculator 330 can be hard coded or programmed into the communication device 300 during manufacturing, can be programmed over-the-air upon customer subscription, or can be a downloadable application. It will be appreciated that other programming methods can be utilized for programming the time of arrival calculator 330 into the communication device 300. It will be further appreciated by one of ordinary skill in the art that the time of arrival calculator 330 can be hardware circuitry within the communication device 300. In accordance with the present invention, the time of arrival calculator 330 can be contained within the processor 315 as illustrated, or alternatively can be an individual block operatively coupled to the processor 315 (not shown). Further operation of the time of arrival calculator 330 will be described subsequently herein.

To perform the necessary functions of the communication device 300, the processor 315 is coupled to the memory 320, which preferably includes a random access memory (RAM), a read-only memory (ROM), an electrically erasable programmable read-only memory (EEPROM), and flash memory. The memory 320, in accordance with the present invention, includes storage locations for the storage of one or more time of arrival data 335, and one or more operational algorithms 340, to be described subsequently herein.

It will be appreciated by those of ordinary skill in the art that the memory 320 can be integrated within the communication device 300, or alternatively, can be at least partially contained within an external memory such as a memory storage device. The memory storage device, for example, can be a subscriber identification module (SIM) card.

In accordance with the present invention, the content of a beacon message is phase and amplitude modulated. The beacon message is transmitted at a constant phase, while the amplitude of the message is modulated as a function of time following a sinusoidal shape. As it can be identified later, although the method is applicable to QAM radios, the transmitted (I,Q) samples are not n-QAM codes, but (I,Q) samples computed for fixed phase and variable amplitude.

An exemplary scenario will now be described herein. In the exemplary scenario, the beacon signal is transmitted in a five (5) MHz channel (200 nanosecond (ns) clock ticks). The duration of the beacon signal is 384 microseconds ($\mu$s) and contains 1920 (I,Q) samples.

Figure 4:
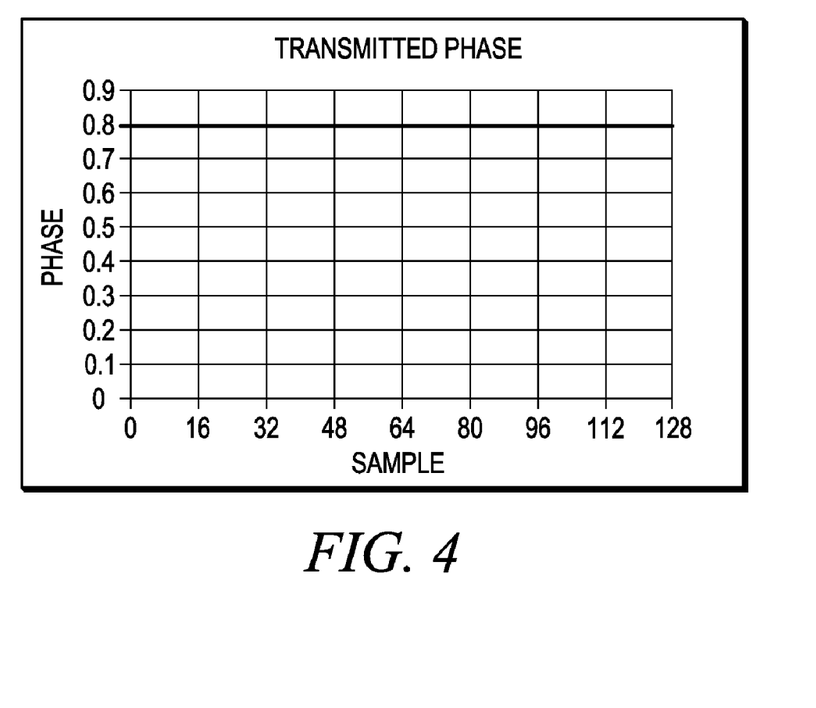
FIG. 4 is an illustration of the phase of a transmitted signal.

FIG. 4 illustrates the constant phase of the first 128 (out of 1920) samples of the transmitted beacon signal. In this particular case, the constant phase is set to $\pi/4$, but any value can be used.

Figure 5:
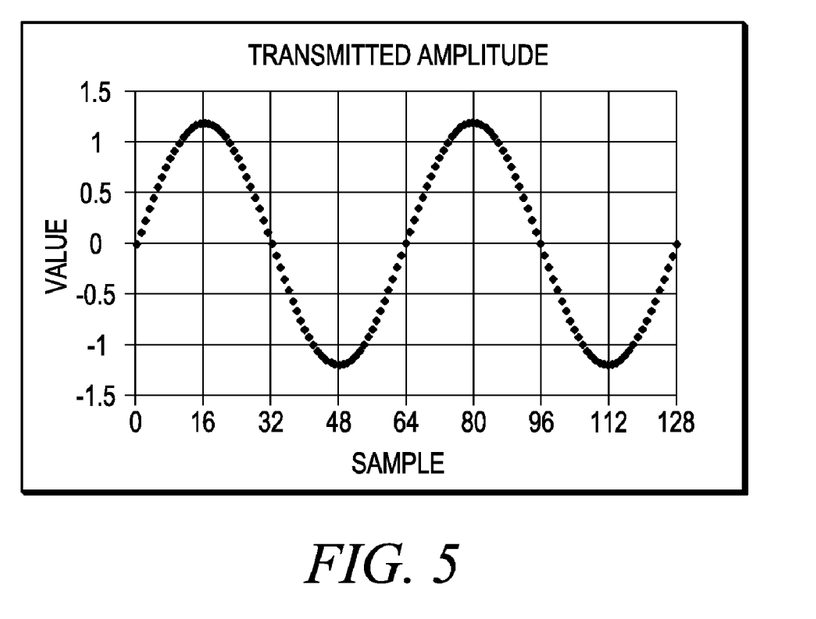
FIG. 5 is an illustration of the amplitude of a transmitted signal.

FIG. 5 illustrates the amplitude of the first 128 samples of the transmitted beacon signal. The beacon signal in this case has the full cycle of sixty four (64) samples transmitted thirty (30) times.

Figure 6:
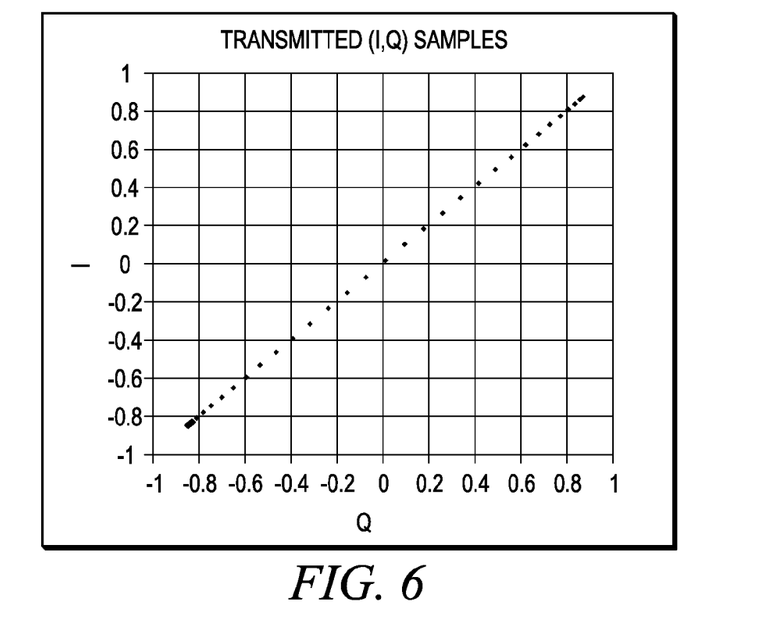
FIG. 6 is an illustration of a transmitted signal represented in complex space.

The QAM "constellation" of transmitted (I,Q) samples is illustrated in FIG. 6. Although the picture shows only thirty two (32) distinct points, the picture has in fact 1920 samples, with only thirty two (32) distinct values.

Figure 7:
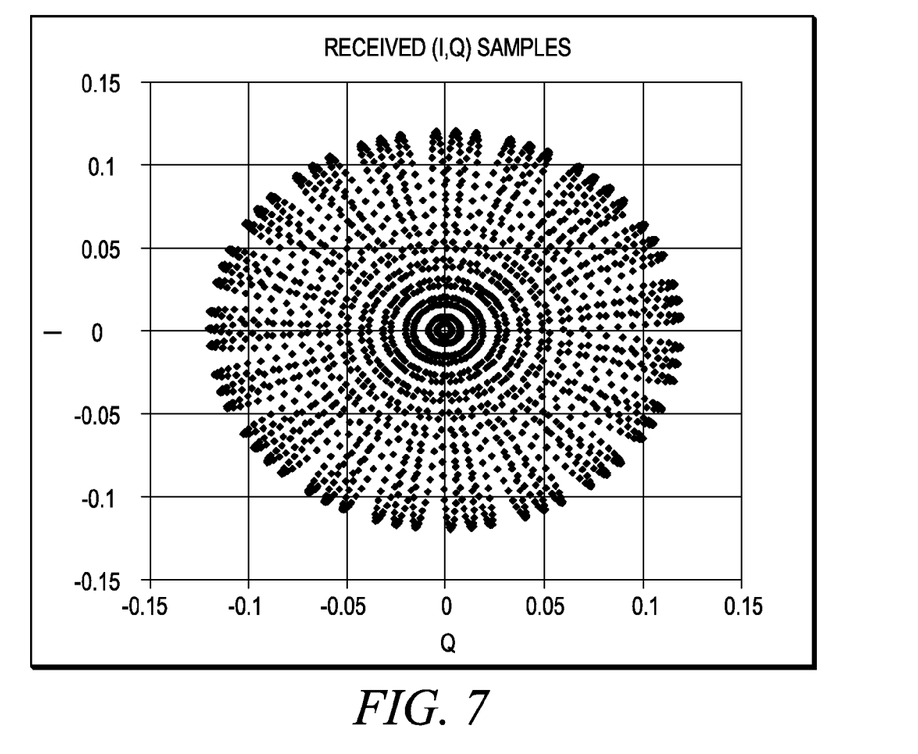
FIG. 7 is an illustration of a received signal represented in complex space.

FIG. 7 illustrates the constellation of received 1920 (I,Q) samples, when the difference between the frequency of the received signal and the receiver frequency is 4000 Hertz (Hz) and the difference between the correct TOA and the estimated TOA is 135 nanoseconds (ns). It should be noted that the sampling clock has a different frequency with reference to the signal. The points, in actuality are the same number of points as in FIG. 6.

Figure 8:
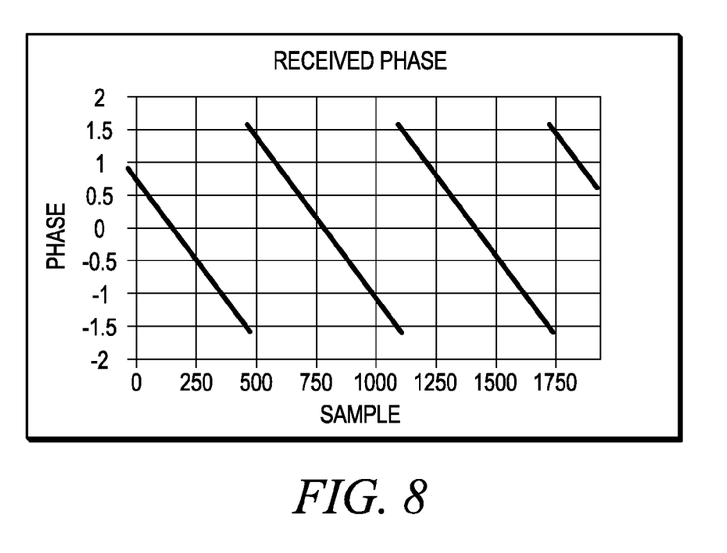
FIG. 8 is an illustration of the phase of a received signal.

The phase of the received samples is illustrated in FIG. 8. As illustrated, during the reception of the beacon signal, the phase wrapped three times from $+\Pi/2$ to $-\Pi/2$, which means that during the reception of the beacon signal the signal phase have changed from 0.7853 to $-8.765$ radians. The slope of the lines in FIG. 8 are the frequency/timing difference between the received signal and the local oscillator. This is caused by the transmit node oscillator not equaling the frequency of receive node oscillator and also the devices being in movement with respect to each other.

Figure 9:
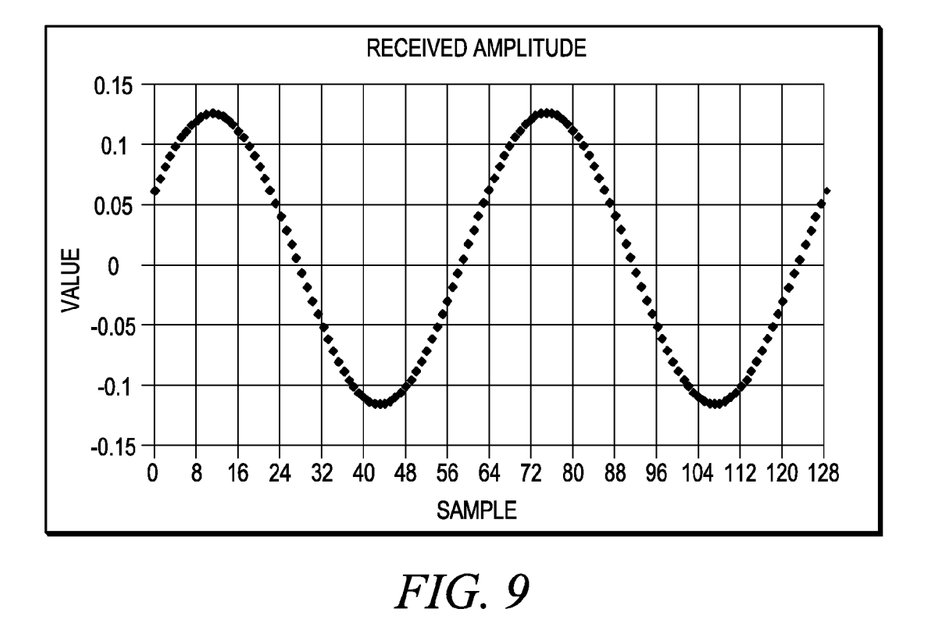
FIG. 9 is an illustration of the amplitude of a received signal.

The variation of the amplitude of the first 128 received samples is presented in FIG. 9 after the phase correction presented in FIG. 8 has been applied to received samples presented in FIG. 7. No noise is illustrated in FIG. 9 for simplicity purposes.

In ideal conditions, the first sixty four (64) samples are repeated thirty (30) times. In real conditions, each received sample is affected by a random error therefore all samples are different.

The Algorithm for TOA Correction

From each received (I,Q) sample of the beacon signal, the receiver computes the phase and the amplitude of the sample.

Equation 1:

$$\varphi_i = \arctan\frac{I_i}{Q_i}$$

$$a_i = \sqrt{I_i^2 + Q_i^2}$$

The amplitude sign is set according with the sign of $I_i$ and $Q_i$. The first values are always positive. The first negative amplitude is set when both $I_i$ and $Q_i$ are negative. From that moment, each group of thirty two (32) amplitude values is set alternatively to negative and positive signs.

In ideal conditions, the same amplitude values should be repeated every sixty four (64) samples (i.e.: $a_0 = a_{64} = a_{128} = \ldots$). In reality, the amplitude values are affected by random errors. The effect of errors can be reduced by averaging every thirty (30) values that should be equal. The averaged set has only sixty four (64) values $A_i$ computed as follows:

$$A_i = \frac{\sum_{k=0}^{29} a_{i+k*64}}{30} \quad i = 0, 1, 2, \ldots, 63 \qquad \text{Equation 2}$$

Figure 10:
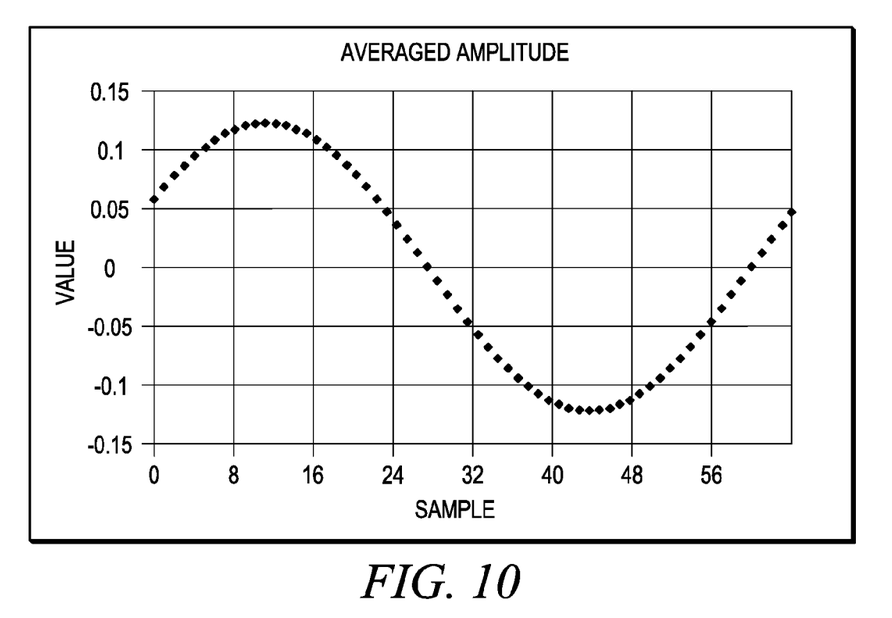
FIG. 10 is an illustration of the averaged amplitude of a received signal.

FIG. 10 illustrates the averaged amplitude set. The values of the amplitude set are the result of a sinusoidal function shifted from the approximated TOA with $\delta$ clock ticks, where $\delta$ is a real number. For example, the whole chain is split into groups of sixty four (64) and each group is averaged. As described previously herein for FIG. 3, the calculations described herein can be stored within the one or more algorithms 340 of the memory 320 and can be calculated by the processor 315 of the communication device 300.

Thus, the equation providing the values of the $A_i$ set is:

$$A_i = p\sin\!\left(2\pi\frac{i+\delta}{64}\right) \text{ for } i = 0, 1, \ldots, 63 \qquad \text{Equation 3}$$

In this equation $\delta$ and p are unknown values, while $A_i$ were computed before with the averaging method.

Equation 3 can also be written as Equation 4

$$A_i = p\!\left(\sin\!\left(2\pi\frac{i}{64}\right)\cos\!\left(2\pi\frac{\delta}{64}\right) + \cos\!\left(2\pi\frac{i}{64}\right)\sin\!\left(2\pi\frac{\delta}{64}\right)\right) \text{for } i = 0, 1, \ldots, 63 \qquad \text{Equation 4}$$

In Equation 4, $\sin(2\pi i/64)$ and $\cos(2\pi i/64)$ are known values. The previous equation can also be written as:

$$\alpha_i = \sin\!\left(2\pi\frac{i}{64}\right) \qquad \text{Equation 5}$$

$$\beta_i = \cos\!\left(2\pi\frac{i}{64}\right)$$

-continued $$x = p\cos\!\left(2\pi\frac{\delta}{64}\right) \text{ for } i = 0, 1, \ldots, 63$$

$$y = p\sin\!\left(2\pi\frac{\delta}{64}\right)$$

$$A_i = \alpha_i x + \beta_i y$$

In Equation 5, $\alpha_i$ and $\beta_i$ are known values, while x and y are unknown. The values of the unknown variables can be computed using LSM.

After the values of x and y are computed, the correction $\delta$ of the approximated TOA is computed from:

$$\delta = \frac{64}{2\pi}\arctan\frac{y}{x} \qquad \text{Equation 6}$$

The computed phase values $\phi_i$ are adjusted with one $\pi$ every time the sequence of values jumps from $+\pi/2$ to $-\pi/2$ or from $-\pi/2$ to $+\pi/2$. The result is a set of 1920 equations with two unknown variables that is solved with a Least Square Method (LSM).

$$\phi_i = \phi_0 + i\psi \text{ for } i = 0, 1, \ldots, 63 \qquad \text{Equation 7}$$

The results of solving this system of equations are the values of the initial phase difference $\phi_0$ and the phase drift $\psi$. The phase drift $\psi$ computed with this equation is expressed in radians per clock tick. The drift is caused by the difference in frequency between the local oscillator and the frequency of the received signal.

The Network Protocol

Figure 11:
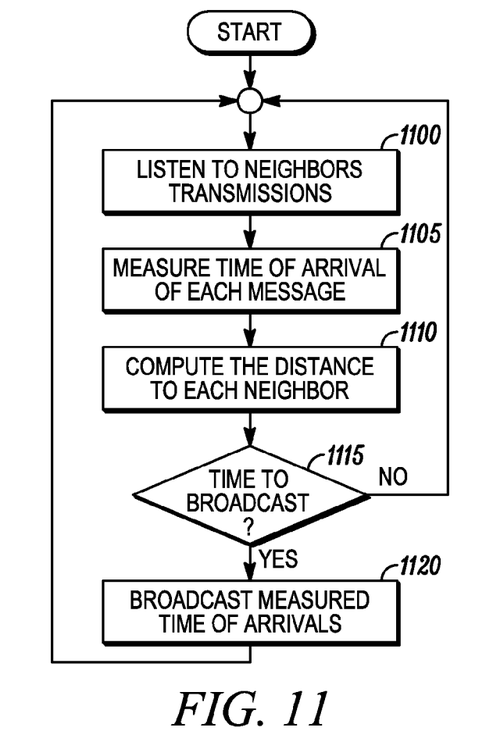
FIG. 11 is a flowchart illustrating an exemplary operation of a network node for measuring the distance between network nodes in accordance with some embodiments of the invention.

FIG. 11 is a flowchart illustrating an exemplary method of operation of a node within a wireless network. In accordance with an embodiment of the present invention, each node transmits a digital message periodically (e.g., when the terminal clock register is zero). All neighbor nodes receive the message and record the respective time of arrival (TOA). In other words, each node receiving the message records the content of the clock register at the receiving time. As will be appreciated, the TOA recorded by all nodes receiving the same message are all different because node clocks are not synchronized. The signal interference is prevented by using either Carrier Sense Multiple Access With Collision Avoidance (CSMA/CA) or TDMA access mode. Since initially the clocks are unsynchronized, clock synchronization is needed for performing TDMA. It is accomplished by performing first a rough clock synchronization, followed shortly thereafter by a fine clock synchronization.

As illustrated, the operation of FIG. 11 begins with Step 1100 wherein the node listens to its neighbors' transmissions. Next, in Step 1105, the Time Of Arrival of each received signal is measured and corrected with the method presented in previous paragraphs herein. Next, in step 1110, the distance between neighbors and between the receiving node and the neighbor that has transmitted the last beacon signal is computed.

In Step 1115, is determined if it is the proper time for the node to broadcast the timing message. When it is not the proper time, the operation cycles back to Step 1100 and the node continues to listen to the transmissions of its neighbors. When it is the proper time in Step 1115, the operation continues to Step 1120, wherein the timing message comprising a message preamble (BPSK modulation), a beacon message (amplitude modulation) and timing information (n-Quadrature and Amplitude modulation) is broadcast. The message preamble is a pseudo random code $p_n$ sequence that is used for synchronizing the receiver to the received signal, identifying an approximated time of arrival, and identifying an approximated frequency difference. In Quadrature Phase Shift Keying (QPSK) modulation, two pseudorandom sequences can be used simultaneously for increasing the precision of TOA measurement. The beacon message is a sequence of 1920 (I,Q) samples modulated in amplitude according with a sin(t) function at constant phase (Π/4) (implies Ii=Qi for any i). The timing information contains the list of neighbors from which messages have been received, along with the Time Of Arrival, the measured frequency shift and the measured frequency drift of each received message. When not operating in TDMA access mode, the node also includes in the timing information the time, according with the local clock, when the current message has been transmitted. When operating in TDMA access mode, the message is transmitted when the clock register has a known value (zero most of the time). In such case, the inclusion of known time of transmission in timing information is not necessary.

The operation then cycles back to Step 1100 wherein the node returns to listening to neighbor transmissions.

The precision of described operation is also affected by the precision of the time of transmission included in the timing information and the time when the transmission actually takes place. Three solutions are possible for assuring accurate timing of transmission. A first solution is to use a clock that holds the transmission until the clock has a predefined value, which is also a requirement for TDMA operation. A second solution is to measure the time of transmission of one beacon and include it in the next timing information message. A third solution is to have special hardware that can copy the contents of the clock register into the transmitted message, after the transmission of the message has started, but before it has ended.

In Step 1110 of FIG. 11, the time of arrivals received in neighbors' timing messages are used for computing various corrections relative to neighbors. For example, from data received in the timing messages are computed the relative speeds of nodes (Doppler) and the Difference of oscillators' frequencies. Further, the virtual range between any two nodes A and B can be computed by computing the clock corrections $d_{AB}$ and the range $p_{AB}$ at any chosen moment $t_A$.

When operating in TDMA wireless networks, for example, the protocol may require each participating node to reserve one or two time slots for performing the timing operation. When operating in a single timeslot, the beacon signal and the timing information are transmitted as part of the same message, with the beacon segment first, followed by the timing information. When operating in two timeslots, the node broadcasts the beacon signal in the first timeslot, while in the second timeslot the node broadcasts the timing information including the values of the corrected TOA and frequency differences. Those values are the measurements of the beacon signals transmitted by neighbors. The transmission time of the beacon signal is not included in transmitted message because TDMA messages are always transmitted at the beginning of the timeslot therefore they are transmitted when the contents of the clock register is known.

The Ranging Algorithm

For better understanding of the ranging algorithm in accordance with the present invention, the following description considers an exemplary network with two nodes only. The difference $\psi_{AB}$ between the frequency of the received signal from node B and the local clock frequency of node A is broadcast in the information message transmitted by node A. Similarly, node B transmits $\psi_{BA}$. The difference of frequencies is caused by the difference of oscillator frequencies df and the Doppler effect D caused by network mobility. Knowing that $df_{AB}=-df_{BA}$ and $D_{AB}=D_{BA}$, the two elements can be computed with:

$$D_{AB} = D_{BA} = \frac{\psi_{AB} + \psi_{BA}}{2}$$

$$df_{AB} = -df_{BA} = \frac{\psi_{AB} - \psi_{BA}}{2}$$

Equation 8

The frequency difference and the Doppler Effect in Equation 8 are in radians per clock tick. Node A broadcasts also the value $TOA_{AB}$ that is the time of arrival of beacon signal transmitted by node B and the time $t_A$ when it has transmitted the beacon signal (for TDMA the value of $t_A$ is always zero and is not included in message). Node B broadcasts $TOA_{BA}$ the time of arrival of beacon signal transmitted by node A and the time $t_B$ when it has transmitted the beacon signal. In this network with two neighbors, the following events can be identified:

| Event | Clock A | Clock B |
| --- | --- | --- |
| Node A transmits beacon | $t_A$ | $t_A + d_{AB}(t_A)$ |
| Node B receives beacon | $t_A + p_{AB}(t_A)$ | $TOA_{BA} =$ $t_A + d_{AB}(t_A) + p_{AB}(t_A)$ |
| Node B transmits beacon | $t_B - d_{AB}(t_B)$ | $t_B$ |
| Node A receives beacon | $TOA_{AB} =$ $t_B - d_{AB}(t_B) + p_{AB}(t_B)$ | $t_B + p_{AB}(t_B)$ |

The elements presented in this table in bold characters are known, as they are values of the clock register when specified events happen. Their values are integer number of clock ticks. It results that the unknown values are also clock ticks values.

This table shows that at the time when node A has transmitted the beacon signal, its clock register was showing the value $t_A$. In the same moment, the clock register at node B was showing the value $t_A+d_{AB}(t_A)$, where $d_{AB}(t_A)$ is the relative clock correction between the clocks of two terminals at time $t_A$.

The beacon message is received at node B after $p_{AB}(t_A)$ that is the signal propagation time, when the clock of terminal B show value $TOA_{BA}$. At time $t_B$, node B transmits the beacon signal. The clock register of node A at the transmission moment shows the value $t_B-d_{AB}(t_B)$. Node A receives the beacon signal after $p_{AB}(t_B)$. The clock difference $d_{AB}(t_B)$ could be different from $d_{AB}(t_A)$, if the two transmissions take place at a large interval. Also the propagation time of the beacon signal transmitted by A, $p_{AB}(t_B)$, could be different from the propagation signal beacon transmitted by B, $p_{AB}(t_B)$, if the nodes have changed the positions significantly between the transmission of two successive messages. In this example, consider that although the interval between transmissions of beacon signals by these two terminals is large, the clock difference and the propagation time have a linear variation proportional with the measured frequency difference and the Doppler Effect. For maintaining the same system of units, the frequency differences should be converted from radians per tick to ticks per tick.

$$d_{AB}^{(t_B)} = d_{AB}^{(t_A)} + (t_A + d_{AB}^{(t_A)} - t_B)\frac{64}{2\pi}df_{AB} \quad \text{Equation 9}$$

$$p_{AB}^{(t_B)} = p_{AB}^{(t_A)} + (t_A + d_{AB}^{(t_A)} - t_B)\frac{64}{2\pi}D_{AB}$$

Replacing the clock correction and the propagation time at time $t_B$ with the expressions in Equation 9, the clock correction and signal propagation time at moment $t_A$ can be computed by solving the following system of two linear equations with two unknown variables $d_{AB}(t_A)$ and $p_{AB}(t_A)$.

$$\begin{cases} TOA_{AB} = t_B - d_{AB}^{(t_A)} - (t_A + d_{AB}^{(t_A)} - t_B)\frac{64}{2\pi}df_{AB} + p_{AB}^{(t_A)} + \\ \qquad (t_A + d_{AB}^{(t_A)} - t_B)\frac{64}{2\pi}D_{AB} \\ TOA_{BA} = t_A + d_{AB}^{(t_A)} + p_{AB}^{(t_A)} \end{cases} \quad \text{Equation 10}$$

Using the values of frequency difference df and Doppler effect D computed in Equation 8:

$$\begin{cases} TOA_{AB} = t_B - d_{AB}^{(t_A)} + p_{AB}^{(t_A)} + (t_A + d_{AB}^{(t_A)} - t_B)\frac{64}{2\pi}\psi_{BA} \\ TOA_{BA} = t_A + d_{AB}^{(t_A)} + p_{AB}^{(t_A)} \end{cases} \quad \text{Equation 11}$$

This system of two equations with two unknown variables $d_{AB}(t_A)$ and $p_{AB}(t_A)$ can be easily solved. The computation of propagation time $p_{AB}(t_A)$ at time $t_A$ and clock correction $d_{AB}(t_A)$ at time $t_A$ can be performed by node A, node B, or by any neighbor node that has received the information from A and B.

In Equation 9 it was considered that the clock correction $d_{AB}(t_B)$ and the propagation $p_{AB}(t_B)$ do not change during the propagation of the signal from B to A. For an average propagation distance of 1 Km and oscillators with 4 ppm frequency difference, the error on $d_{AB}(t_B)$ because of this presumption could be 0.01 ns. For the same average propagation distance of 1 Km, when the distance between the two nodes changes at the speed of sound, the error on $p_{AB}(t_B)$ is 0.003 ns.

Difference of Time Of Arrival (DTOA)

Traditionally, the DTOA location method is applied only to cellular networks using synchronized base stations. Using our method for computing the precise TOA and clock correction, the DTOA method can be applied also to un-synchronized networks.

TDMA Synchronization

The system in Equation 11 provides the size of the clock correction $d_{AB}$ that should be applied to clock running in node A for achieving the synchronization of the network as required for operation in TDMA access mode.

Further embodiments of the present invention can use beacons of different shapes other than sinusoidal, as the one used for presenting the method and with phase modulated with a function instead of having a constant value as presented in the exemplary embodiment. For minimizing the effect of multipath propagation, the initial signal can be randomized using one of the known methods. At the receiving site, the received signal is first de-randomized, before applying the method of this invention.

The present invention provides the correction to the TOA measured with the classical method of impulse response. Since the correction can be computed with floating point precision, the precision of the method is independent of the precision of the approximated TOA therefore it is independent of the channel width.

The method can predict the value of TOA using the frequency difference and Doppler Effect as shown in Equation 10. The prediction of TOA allows prediction of ranges to all neighbors at the same instant, fact that increases the precision of computed location.

In summary, advantages of the present invention include bandwidth independent precision, high precision of TOA, simultaneous TOF (making the method independent of vehicular speed), and provides data for very tight network synchronization (TDMA).

This method and system is especially applicable for firefighter location (slow moving networks), highway location (fast moving networks), autonomous (self relative) location systems (no fixed pre-deployed references), transport of absolute coordinates inside tunnels, buildings, on narrow streets, or anywhere GPS signals are not available or are unreliable.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

We claim:

1. A method of communication of a message within an ad hoc network comprising:
   transmitting a beacon from a first node, wherein the beacon comprises a digital message of a known content;
   receiving the digital message at a second node;
   synchronizing at the second node on the received digital message using an autocorrelation method, wherein the synchronizing step comprises:
   computing an approximated time of arrival,
   computing an approximated frequency difference between a local oscillator and the received digital message; and
   correcting the approximated time of arrival and the frequency difference.

2. A method of operation of a node within a wireless network comprising:
   receiving a digital message from a neighbor node;
   recording a time of arrival of the received digital message; and
   correcting the time arrival of the received digital message, wherein the correcting of the time of arrival comprises computing one or more relative corrections selected from a group comprising relative speeds of nodes, relative differences of oscillators' frequencies, and virtual ranges between nodes.

3. A method of operation of a node within a wireless network as claimed in claim 2, wherein the receiving step comprises receiving the digital message including a timing message, wherein the timing message comprises:
   a message preamble,
   a beacon message, and
   a timing information.

4. A method of operation of a node within a wireless network as claimed in claim 3, wherein the message preamble comprises a pseudo random code pn sequence in binary phase-shift keying modulation, and further wherein the correcting step comprises:
   synchronizing a receiver to the digital message signal,
   identifying an approximated time of arrival, and
   identifying an approximated frequency difference.

5. A method of operation of a node within a wireless network as claimed in claim 3, wherein the beacon message comprises:
   a sequence of (I,Q) samples modulated in amplitude and phase according with one or more defined functions.

6. A method of operation of a node within a wireless network as claimed in claim 3, wherein the timing information comprises:
   a list of neighbor nodes from which one or more messages have been received, along with the Time Of Arrival, the measured frequency shift and the measured frequency drift of each received message.

7. A method of operation of a node within a wireless network as claimed in claim 6, wherein the timing information further comprises:
   a time, according to a local clock, when a message was transmitted.

8. A node within an ad hoc wireless communication network comprising:
   a transceiver for communicating one or more messages with one or more other nodes within the ad hoc wireless communication network using quadrature amplitude modulation;
   a clock register for determining a current time;
   a memory for storing one or more time of arrival calculations and one or more algorithms;
   a local oscillator; and
   a time of arrival calculator coupled to the transceiver, the clock register, the local oscillator, and the memory for determining a time of arrival of one or more received messages,
   wherein the time of arrival calculator uses the stored one or more algorithms to:
      synchronize a received digital message using an autocorrelation message including:
         retrieving a time of arrival from the clock register,
         computing an approximated frequency difference between the local oscillator and the received digital message, and
         correcting the approximated time of arrival and the frequency difference.

9. A node within an ad hoc wireless communication network as claimed in claim 8, wherein the correcting comprises computing one or more relative corrections selected from a group comprising relative speeds of nodes, relative differences of oscillators' frequencies, and virtual ranges between nodes.

10. A node within an ad hoc wireless as claimed in claim 8, wherein the received digital message comprises a timing message, and further wherein the timing message comprises:
   a message preamble,
   a beacon message, and
   a timing information.

11. A node within an ad hoc wireless as claimed in claim 10, wherein the message preamble comprises a pseudo random code pn sequence in binary phase-shift keying modulation, and further wherein the correcting comprises:
   synchronizing a receiver to the digital message signal,
   identifying an approximated time of arrival, and
   identifying an approximated frequency difference.

12. A node within an ad hoc wireless as claimed in claim 10, wherein the beacon message comprises:
   a sequence of (I,Q) samples modulated in amplitude and phase according with one or more defined functions.

13. A node within an ad hoc wireless as claimed in claim 10, wherein the timing information comprises:
   a list of neighbor nodes from which one or more messages have been received, along with the Time Of Arrival, the measured frequency shift and the measured frequency drift of each received message.

14. A node within an ad hoc wireless as claimed in claim 10, wherein the timing information further comprises:
   a time, according to a local clock, when a message was transmitted.

* * * * *